US011109427B2

(12) United States Patent
Fraser et al.

(10) Patent No.: US 11,109,427 B2
(45) Date of Patent: Aug. 31, 2021

(54) MESH CONFIGURATION NETWORK (71) Applicant: HEWLETT PACKARD ENTERPRISE DEVELOPMENT LP, Houston, TX (US)

(72) Inventors: Mark Gordon Fraser, Roseville, CA (US); Michael Bozich Calhoun, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 61 days.

(21) Appl. No.: 16/506,259

(22) Filed: Jul. 9, 2019

(65) Prior Publication Data
US 2021/0014907 A1 Jan. 14, 2021

(51) Int. Cl.
*H04L 12/28* (2006.01)
*H04W 76/10* (2018.01)
(Continued)

(52) U.S. Cl.
CPC ........ *H04W 76/10* (2018.02); *G06F 13/4282* (2013.01); *H04L 41/0803* (2013.01);
(Continued)

(58) Field of Classification Search
None
See application file for complete search history.

(56) References Cited

U.S. PATENT DOCUMENTS

| 2011/0032844 A1* | 2/2011 | Patel | H04W 88/14 370/255 |
| 2016/0143028 A1* | 5/2016 | Mancuso | H04W 12/08 370/338 |

(Continued)

FOREIGN PATENT DOCUMENTS

CN 108183827 6/2018

OTHER PUBLICATIONS

Darroudi, S.M. et al., Bluetooth Low Energy Mesh Networks: a Survey, (Research Paper), Sensors (Basel), Jun. 22, 2017, vol. 17, No. 7, 21 Pgs.

(Continued)

*Primary Examiner* — Phirin Sam
(74) *Attorney, Agent, or Firm* — Nolte Lackenbach Siegel (57) ABSTRACT

Systems and methods are provided to allow configuration of network devices via a Bluetooth® (or other short range wireless) configuration network using a mesh network implementation. This configuration mesh network may represent a mesh network independent of any active wired or production network within an enterprise computer system. For security of a network infrastructure for the enterprise computer system, wired ports on network infrastructure devices may be disabled prior to configuration via the configuration mesh network. New devices may be physically but not communicatively connected to the production network (e.g., cables may be connected to disabled ports) and then configuration may be performed via the configuration mesh network to allow the new devices to become active (e.g., join with production devices) within the network infrastructure. Run-time configurations for production devices may also be maintained using a separate configuration mesh network.

20 Claims, 8 Drawing Sheets

(51) Int. Cl.
*H04L 12/24* (2006.01)
*G06F 13/42* (2006.01)
*H04W 84/18* (2009.01)
*H04W 4/80* (2018.01)

(52) U.S. Cl.
CPC ...... *H04L 41/12* (2013.01); *G06F 2213/0042* (2013.01); *H04W 4/80* (2018.02); *H04W 84/18* (2013.01)

(56) References Cited

U.S. PATENT DOCUMENTS

2018/0160334 A1  6/2018  Deshpande
2019/0036722 A1  1/2019  Singamsetty et al.

OTHER PUBLICATIONS

Extending Bluetooth with Mesh Networking, (Web Page), Sep. 20, 2017, 9 Pgs.
Getting Started with Bluetooth Mesh Development, (Research Paper), Dec. 13, 2018, 16 Pgs.
Wilson, M., Top Cisco Network Monitoring Tools & Software for Network Engineers, (Web Page), Jan. 5, 2019, 17 Pgs.
Generic Attribute Profile, "Developing a Bluetooth Low Energy Application", available online at <https://web.archive.org/web/20180212114640/http://dev.ti.com/tirex/content/simplelink_cc2640r2_sdk_1_40_00_45/docs/blestack/ble_user_guide/html/ble-stack-3.x/gatt.html>, Feb. 12, 2018, 28 pages.
Martin Woolley, "Bluetooth Mesh Networking: An Introduction for Developers", Bluetooth SIG Proprietary, 2017, pp. 1-28.

\* cited by examiner

MESH CONFIGURATION NETWORK

BACKGROUND

Networks of computers that support business activities are often composed of a multitude of infrastructure devices (e.g., computational, storage, and network resources). These infrastructure devices may provide, for example, a cohesive system of coordinated computing devices that support many automated functions for a corporate enterprise. In some cases, these computing devices are connected to a network for communication with each other. Wireless (e.g., WiFi® networks, or Bluetooth®) and wired networks may be connected to each other. For example, using a device referred to as an Access Point (AP), connectivity from a wireless network to a wired network may be achieved.

For wireless mesh networks a corollary to the AP may be referred to as a Mesh Point (MP). A client device of a mesh network may connect to a mesh access point that provides mesh network wireless network connectivity for the MP as an entry point to a wired network. In short, wireless client devices first connect to an AP and, if desired, are transitioned to a wired network either by the AP (in traditional WiFi®) or via an MP (for mesh). In a mesh network, it is possible for a device to be both an MP and an AP. It is also possible that client devices may communicate through a wireless network without having their transmissions transferred to a wired network.

Wireless network connections between two devices may be used to connect two network devices over a short distance (e.g., shorter distance than is possible using a wired connection). The use of wireless networking is common to connect smart-phones, laptops, tablets, and other computing devices to a local area network. Wireless networking may also be utilized to implement a point-to-point connection over short distances to allow the connection of two network sub-nets that may be composed of machines utilizing a wired network. In a mesh network, different wireless devices may be configured to act as peer-to-peer devices to establish a communication path from a wireless network to a wired network (or to simply support a totally wireless network). That is, some APs that do not have an uplink may piggyback off another AP's uplink (e.g., an MP/AP combination device) seamlessly for the clients that are supported by those APs that do not have an uplink. In a non-mesh configuration, each AP connects, via a physical wired connection, to a network backbone. Hybrids of mesh and non-mesh wireless networks are possible and represent a network where only a portion of the APs provide an uplink via a physical wire.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not perform serial processing and therefore those functions may be performed in an order different than shown or possibly in parallel with each other. For a detailed description of various examples, reference will now be made to the accompanying drawings, in which.

DETAILED DESCRIPTION

Illustrative examples of the subject matter claimed below will now be disclosed. In the interest of clarity, not all features of an actual implementation are described for every example implementation in this disclosure. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Disclosed is a system and method that uses a short range wireless network (e.g., Bluetooth) to connect to a device (e.g., router/switch) to perform system administrative configuration actions and may also prevent connecting unconfigured devices to a network. In general, a network infrastructure device (e.g., router/switch) is provided that includes a network interface to wirelessly connect to a remote device executing a configuration interface. The remote device may be any type of computing device such as a smart phone, tablet, laptop, etc. The network interface may be either built-in or attached to a communication port of the network infrastructure device (e.g., a dongle or other component to support the disclosed parallel wireless administration network). In some implementations, the network interface may be connected and disconnected from the network infrastructure device periodically (e.g., during administration) or may be maintained for on-going network administration. The above referenced communication port may be a communication port that is not initially a network enabled communication port (such as a serial communication port). In such a case, the dongle or plug in component provides the network communication capability for that port.

For security and other reasons, the network infrastructure device may be pre-configured to disable all wired communication ports. Having all wired communication ports disabled by default may allow the network infrastructure device to be physically connected to a wired network in a secure manner (e.g., connected to a production network that has other active production devices). That is, the network infrastructure device may be physically connected to a production network in a dormant state. This may allow a system network administrator to physically connect (and power on) new network infrastructure devices to a production network in a secure manner prior to applying run-time configuration settings. If, on the other hand, an unconfigured network infrastructure device were attached to a wired network with enabled wired communication ports, the security of the wired network may be compromised (e.g., susceptible to intruder attack via the wired network).

Further, some implementations of data centers may include multiple logical or physically segregated networks with one of the segregated networks used as a management network (e.g., isolated from user data on the production network(s)). Accordingly, the disclosed implementations of a wireless mesh network may be used to replace and/or supplement an existing secondary management network. In some implementations, this may reduce the number of cables and networks that must be separately maintained within a given data center. As a result, disclosed techniques may represent an improvement for both security and maintenance efforts of data centers.

Using a short range wireless network (e.g., Bluetooth®) in the manner described herein may increase security to ensure that devices are properly configured prior to actual production network access (e.g., prior to wired network access). A mesh network may be provided by a set of devices within proximity to each other to allow an increase in configuration range of communication between the administrative interface and the device being configured. In short, the mesh network may be thought of as an independent, isolated, secure, secondary administrative network to access devices for initial configuration. Further, the secondary administrative network may be used for on-going administrative actions in addition to providing the initial configuration capability.

Wireless network connections typically may be used to connect network devices over a short distance. The use of wireless networking is common to connect smart-phones, laptops, tablets, and other computing devices to a local area network. Wireless networking may also be utilized to implement a point-to-point connection over short distances. In some cases, a point-to-point wireless connection may be used to allow the connection of two network sub-nets that may be composed of machines utilizing segregated wired networks. In other cases, a wired point-to-point connection may be used to connect two independent wireless networks.

Using wireless networking, however, is not without some technical limitations; wireless networking utilizes radio waves to communicate, and radio waves are subject to interference and degradation due to distance between two devices of each point-to-point connection. One method to increase communication distances includes utilization of a mesh network where peer devices may forward transmissions amongst their peers.

As discussed above, one type of wireless network is a mesh network that does not have every access point connected directly to a common backbone (typically wired). In a mesh network, different wireless devices may be configured to act as peer-to-peer devices. In some disclosed implementations this mesh network may be used to establish a communication path from a wireless network configuration device through a set of intermediary devices (e.g., mesh points or mesh portals) to arrive at its ultimate destination. Each communication path in a mesh network that is not simply a point-to-point communication connection may be thought of as being daisy chained through a set of intermediary devices (e.g., mesh peers). For example, each of the intermediary devices may have their own point-to-point wireless connection with other devices within their wireless network range. Thus, a configuration device may be able to establish a network communication path to all devices in one or more server rooms of a corporate enterprise by first establishing a secure point to point connection with a first device and allowing a set of intermediary devices (starting with the first device) to relay communications through the mesh network to an ultimate destination device.

Disclosed techniques involve providing a secure mesh network as a secondary administrative network. This secondary network may have increased security over a wired network, in part, because on a wired network all devices are on a common network media (i.e., the wire). For example, if that common network media has compromised access each device connected thereto may be subject to potentially mischievous network traffic (malware, spyware, viruses, etc.). Further, the short-range nature of wireless technology may allow for further security because an intruder may be prevented (e.g., via physical security measures) from gaining proximity within proper transmission range of the wireless administration network.

Mesh devices learn about their environment when they boot up (or instantiate a mesh configuration). Mesh portals and mesh points are also known as mesh nodes. Mesh nodes or mesh peers are generic terms used to describe devices configured to participate in a mesh (or hybrid) network (e.g., both mesh portals and mesh points are considered mesh nodes).

In simple terms, a "mesh link" refers to the data link between a mesh node and its parent (the parent may be another mesh point that acts as a relay or a mesh portal that connects to the wired network). The mesh link may then be adjusted based on a series of metrics to establish a best path to different destination nodes. When creating the initial mesh link, mesh nodes may look for mesh points advertising the same mesh service set identifier (MSSID) as the one contained in this nodes profile. The mesh node may then scan the channels in the appropriate provisioned band of operation to identify a list of neighbors that match the active MSSID. The mesh node may then identify a path using highest priority neighbors based on the least expected path cost. Based on operating parameters (e.g., quality of signal) a mesh node may, over time, alter a path for an active mesh link. In some cases, changing a mesh link may invalidate all of the entries that have previously identified mesh nodes as a next hop to the destination and trigger a new learning of network bridge tables. In some implementations, mesh nodes do not individually make the above determinations and are provided appropriate information from another mesh point or a mesh controller.

In the context of this disclosure, consider that a mesh link may be established between a client network infrastructure configuration device (CNICD) (e.g., a device executing a network configuration application that provides a network configuration user interface) and a network infrastructure device (e.g., switch/router) to be configured. The mesh link may be a point-to-point connection between the CNICD and the network infrastructure device. The mesh link may also be a communication path that relies on peer devices (i.e., other mesh nodes) between the CNICD and the network infrastructure device. Still further, the mesh link may be a communication path that relies on one or more wired connections to complete the communication path between the CNICD and the network infrastructure device. However, in a case where there is a wired connection at some point in the communication path, that wired connection will represent an intermediary hop and not represent the last (or first) hop in the communication path. In short, for some disclosed implementations, it is possible for one or more wired connections to "bridge" between segregated wireless networks such as between two different data centers located remotely from each other.

Figure 1:
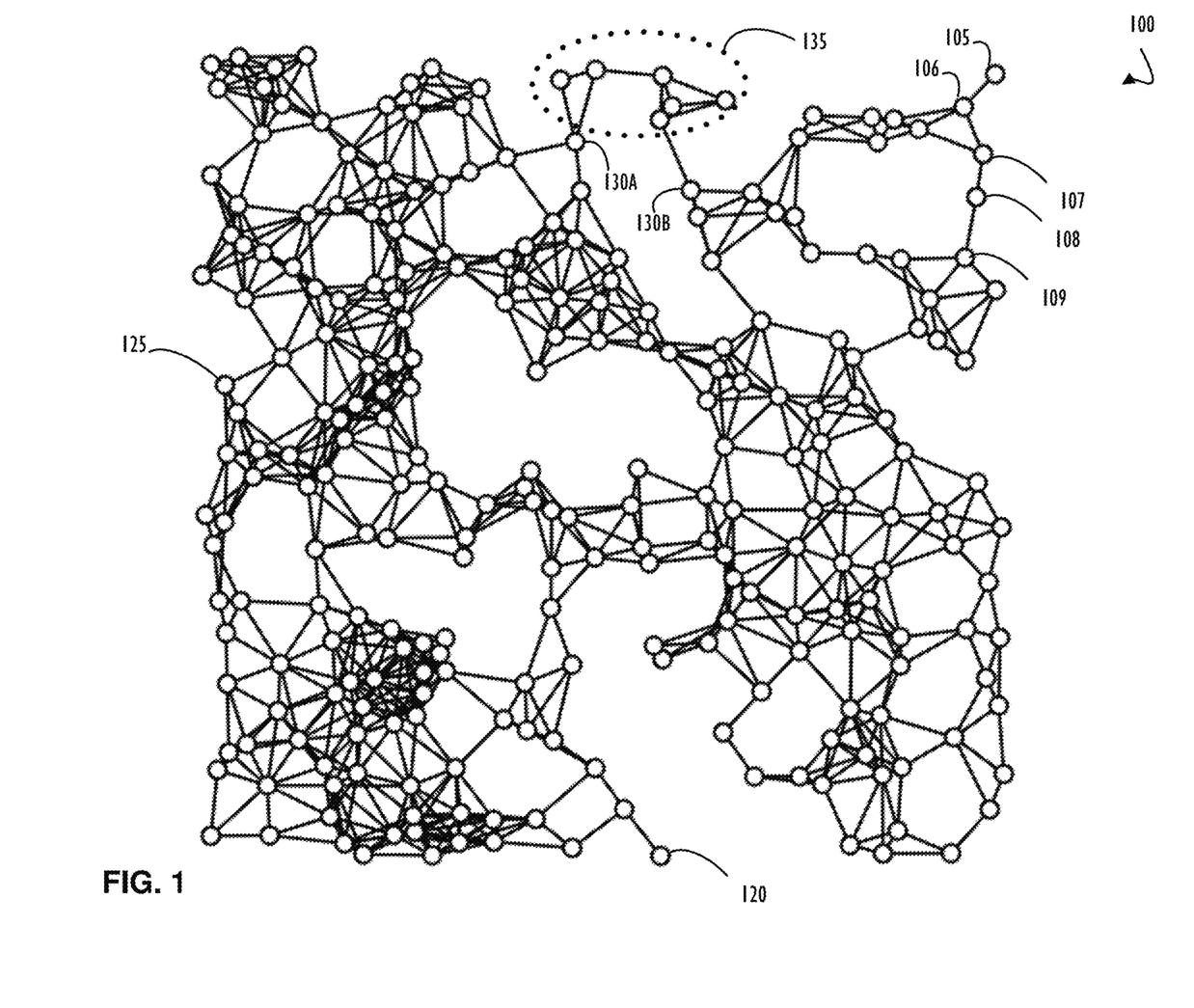
FIG. 1 is a network topology diagram illustrating possible communication paths between devices of a computer network that may be a mesh network, wired network, or hybrid of the two, according to one or more disclosed examples.
Figure 2A:
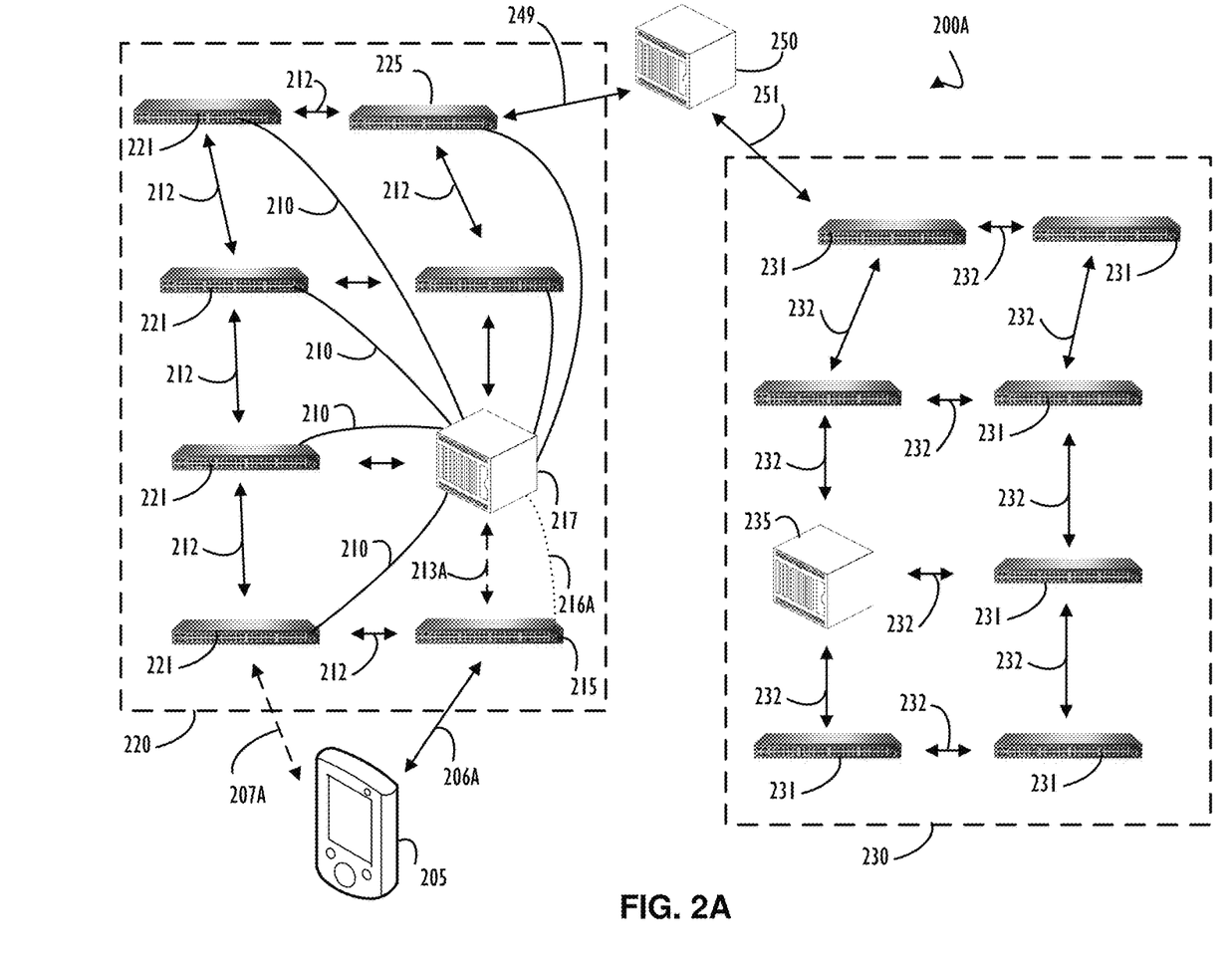
FIG. 2A is a functional block diagram representing an example of a client network infrastructure configuration device (e.g., a device executing a network configuration application with a network configuration interface) and possible communication capabilities to devices of a local data center as well as a second, possibly remote, data center via an intermediary device, according to one or more disclosed examples.
Figure 2B:
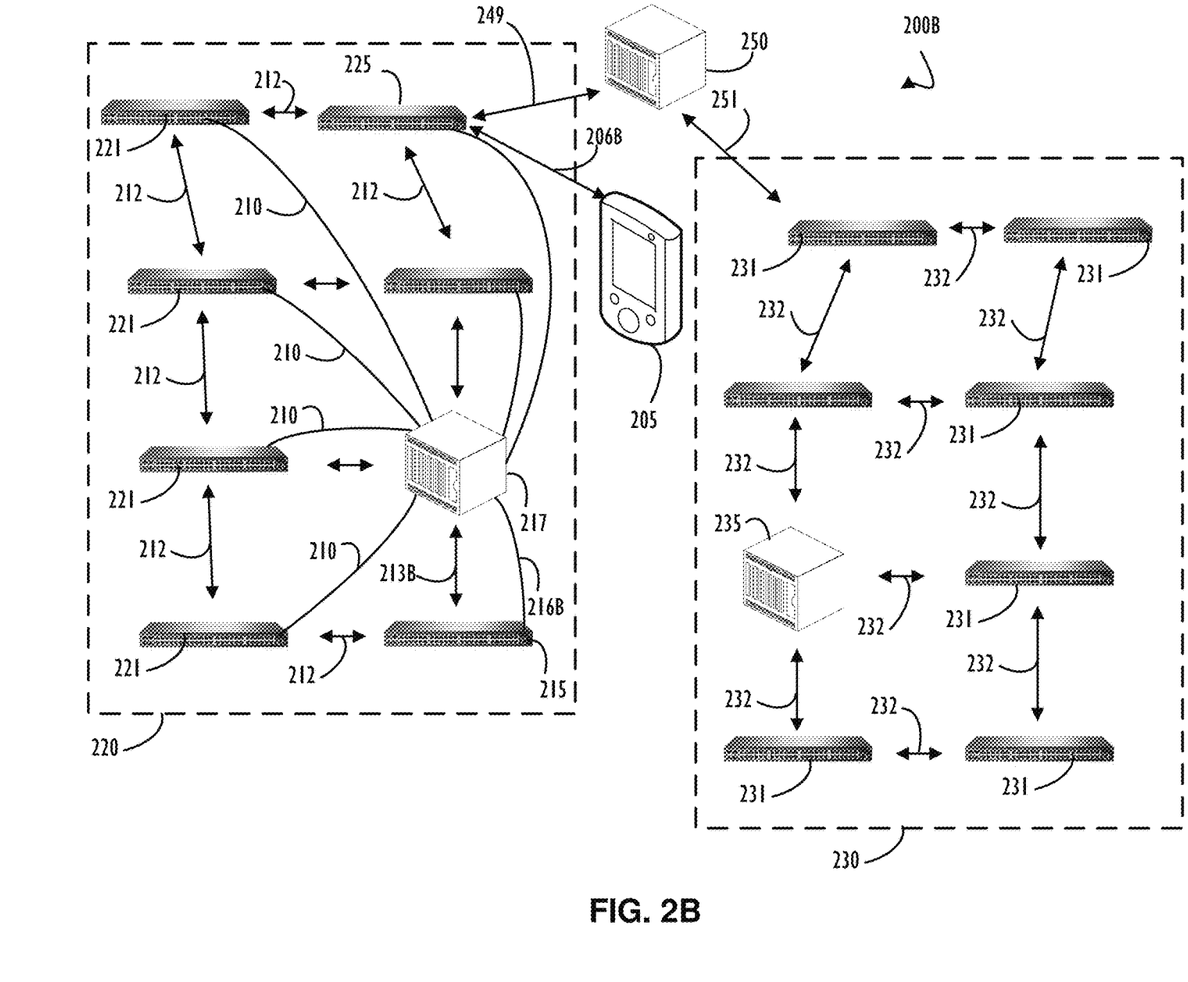
FIG. 2B is a functional block diagram illustrating possible changes to the communication paths of FIG. 2A based on configuration changes and physical movement of the client network infrastructure configuration device, according to one or more disclosed examples.
Figure 3:
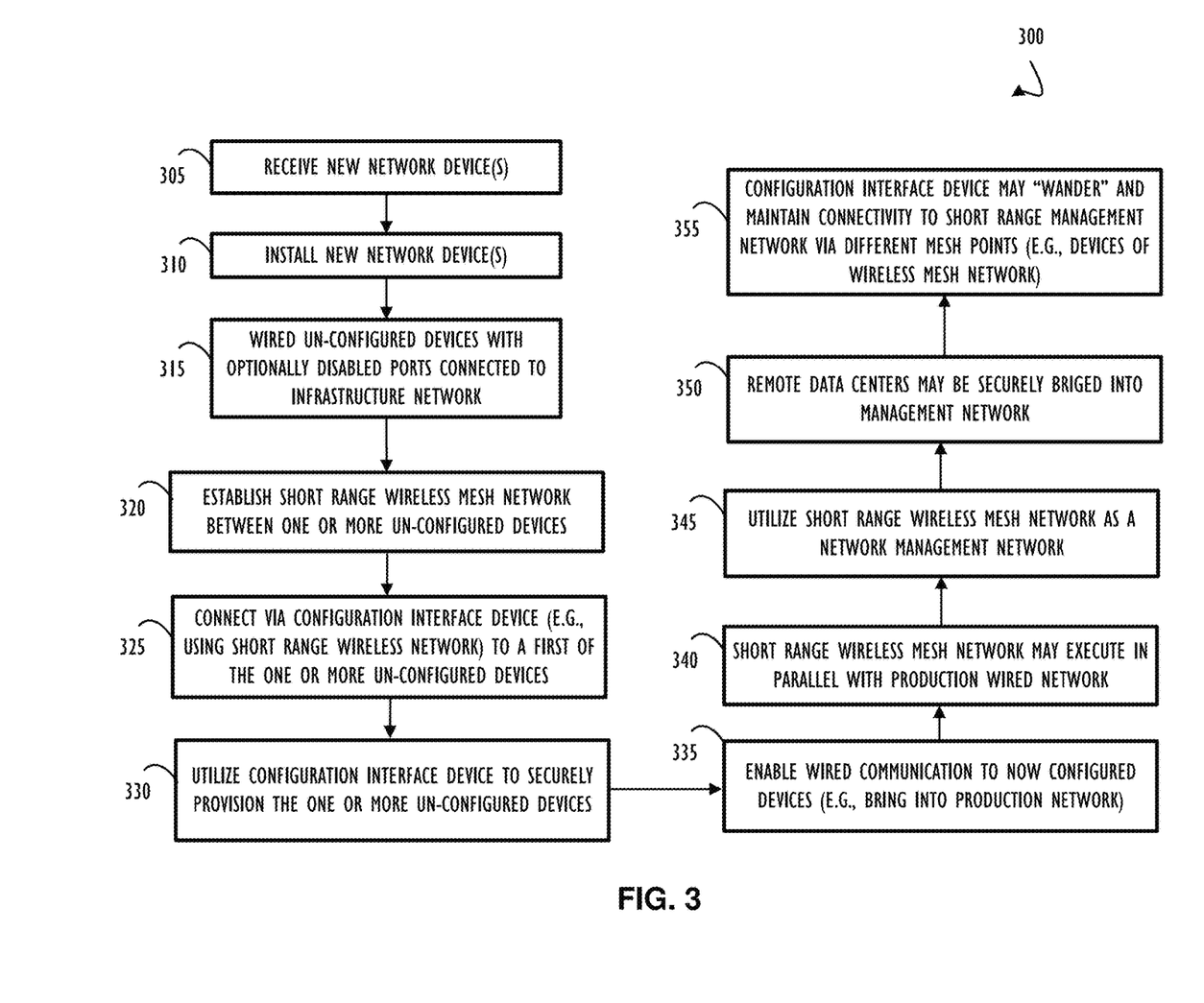
FIG. 3 is a functional flow chart representing a possible workflow utilizing a client network infrastructure configuration device and a wireless mesh configuration network executing in parallel with a wired production network, according to one or more disclosed examples.
Figure 4:
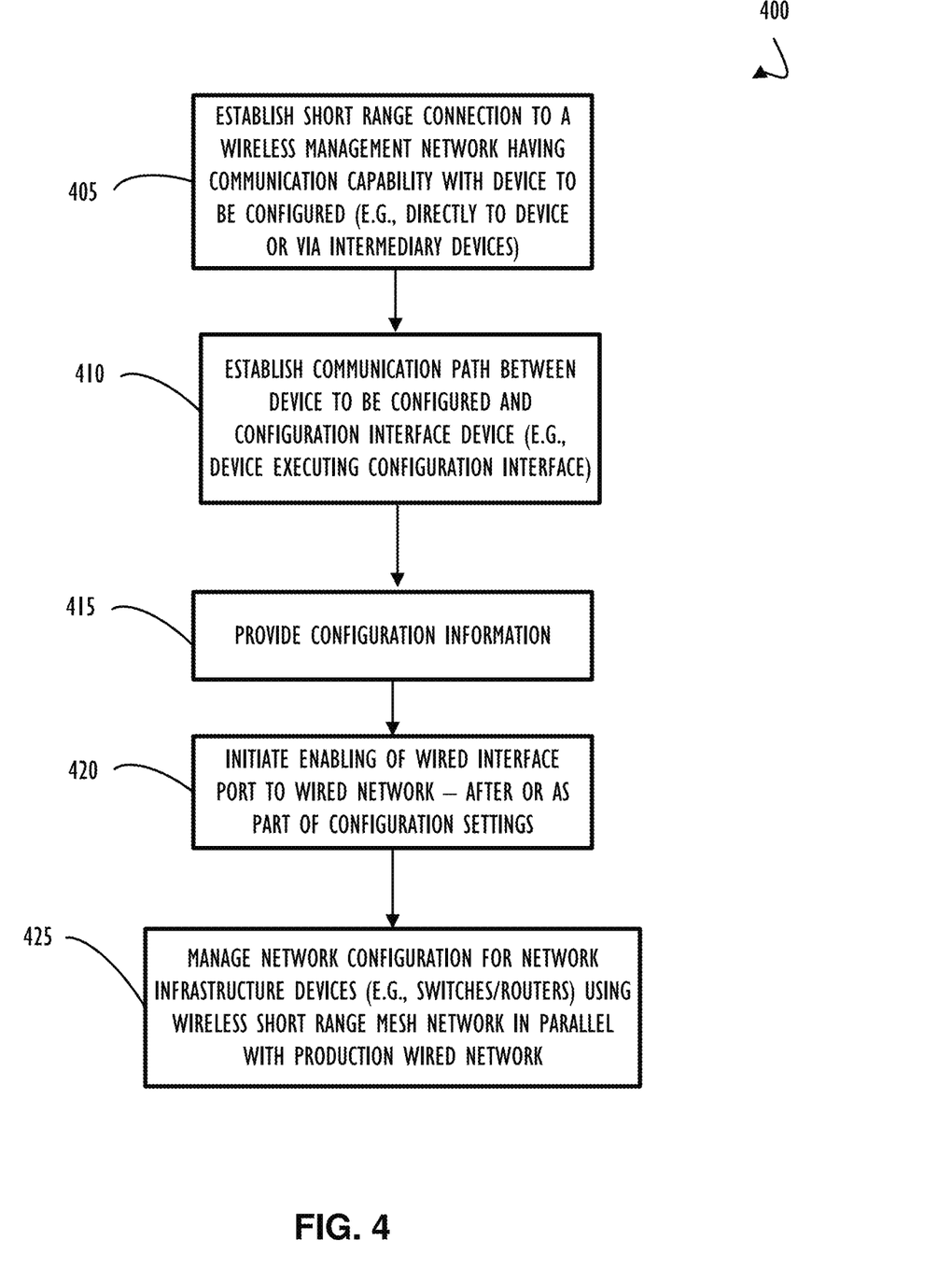
FIG. 4 is a functional flow diagram representing an example of functions of a client network infrastructure configuration device and possible responsive actions for network configuration based on instructions from the client network infrastructure device, according to one or more disclosed examples.
Figure 5:
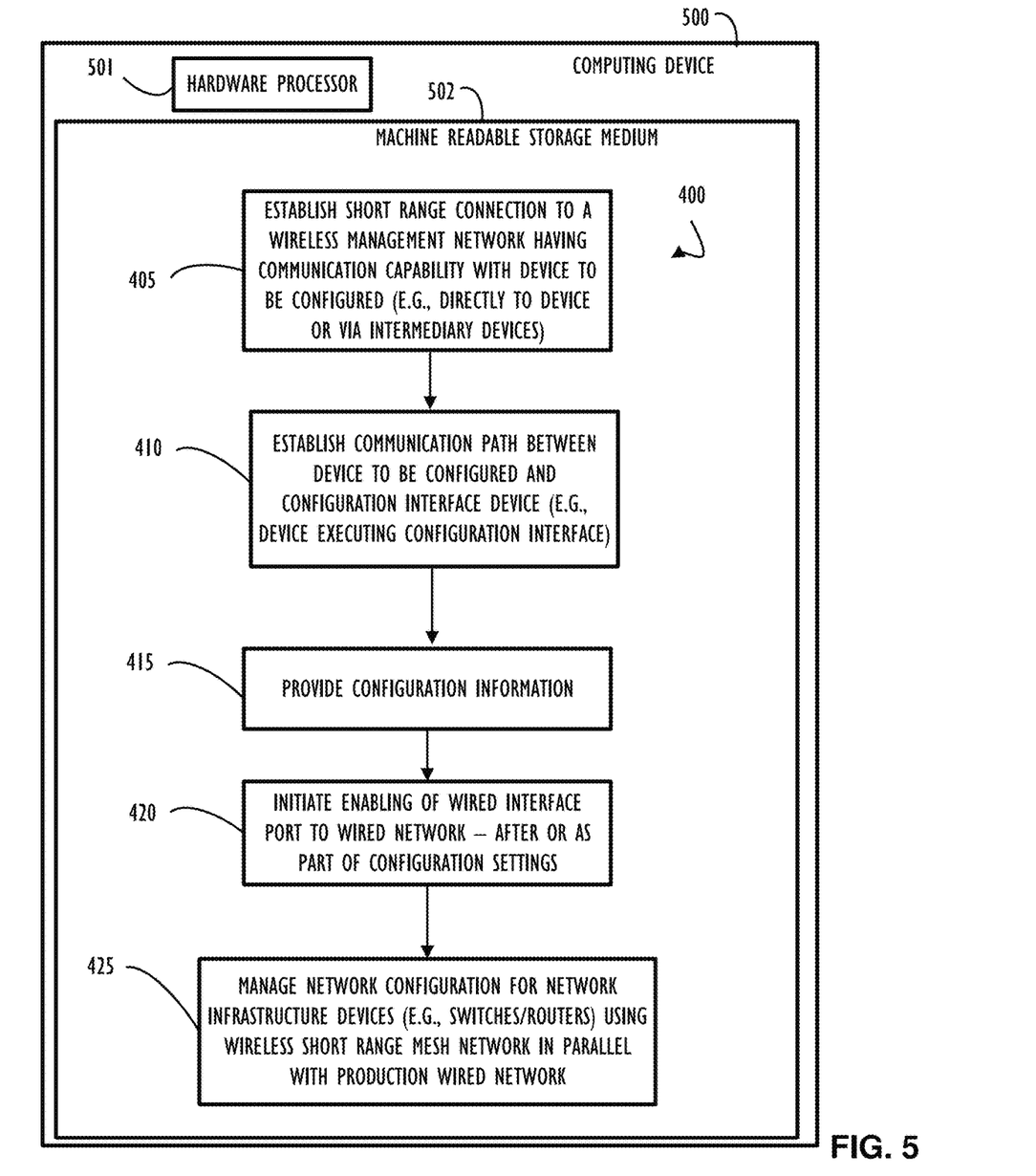
FIG. 5 is an example computing device (e.g., a client network infrastructure configuration device) with a hardware processor and accessible machine-readable instructions that may be used to implement the functional flow of FIG. 4, according to one or more disclosed examples.
Figure 6:
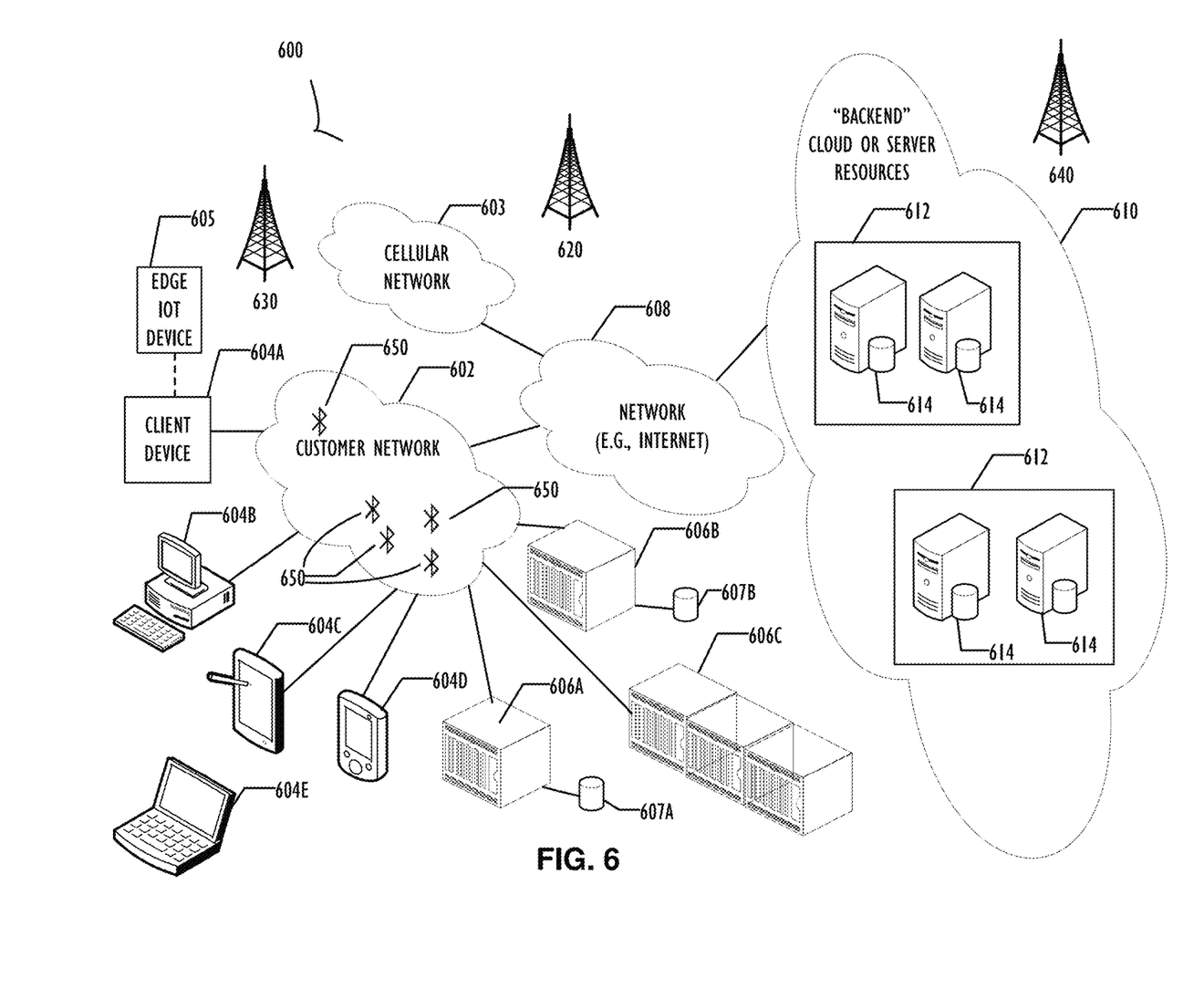
FIG. 6 represents a computer network infrastructure that may be used to implement all or part of the disclosed wireless network techniques, according to one or more disclosed implementations.
Figure 7:
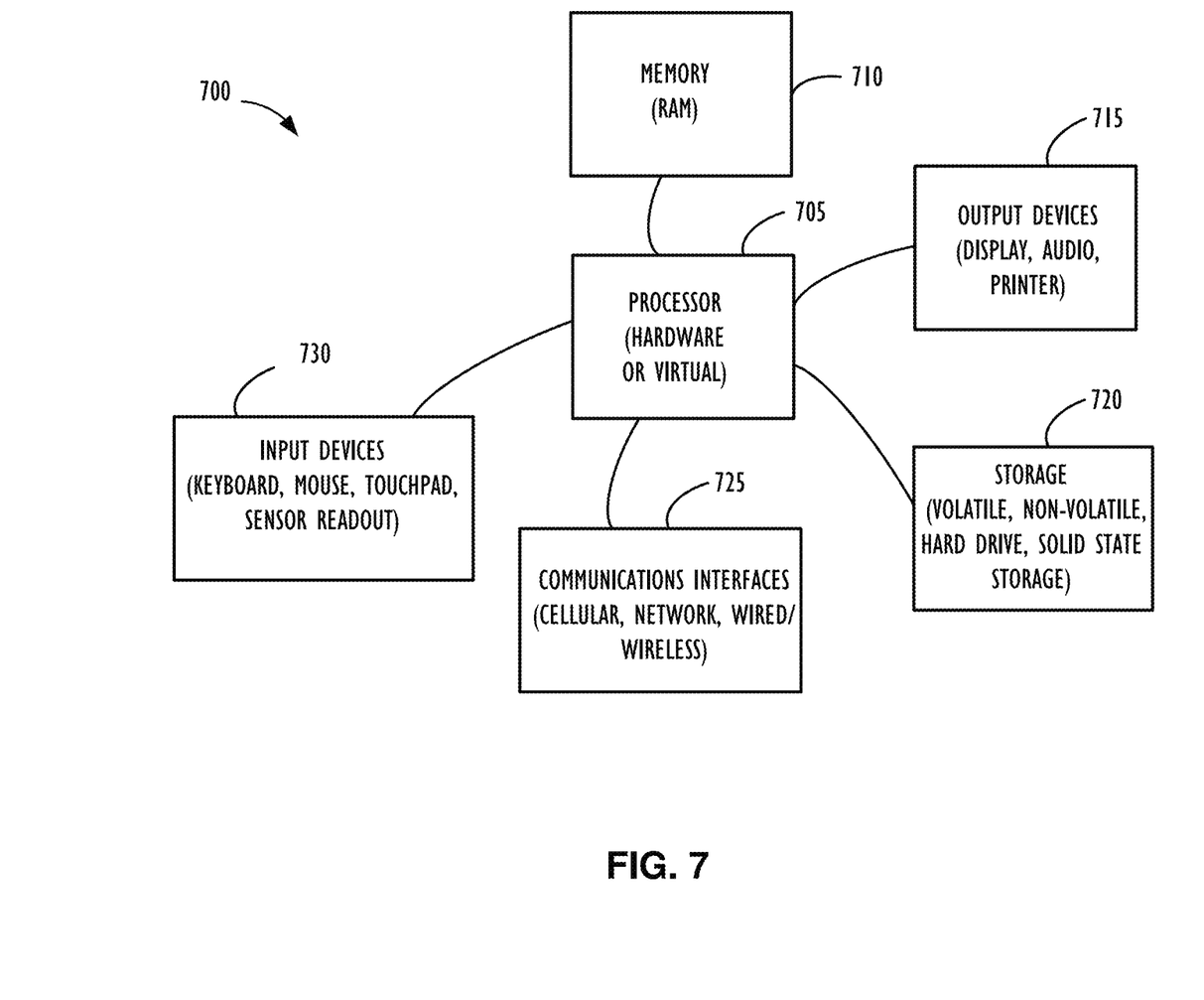
FIG. 7 illustrates a computer processing device that may be used to implement the functions, modules, processing platforms, execution platforms, communication devices, and other methods and processes of this disclosure.

Referring now to FIGS. 1-7, one example network topology to illustrate communication paths via a mesh or hybrid network is illustrated in FIG. 1. FIGS. 2A-B illustrate an example CNICD and interaction between the CNICD and a network infrastructure device (e.g., switch/router) to be configured using disclosed techniques. FIG. 3 provides an example process flow for possible administrative actions that may be provided by the disclosed CNICD. FIGS. 4-5 provide an example method that may be performed by a CNID configured in accordance with disclosed techniques and device implementing the method, respectively. FIG. 6 illustrates an example network infrastructure representing a computing environment where some or all portions of the disclosed administration techniques may be implemented. FIG. 7 illustrates a block diagram of a processor that may be included within a CNICD, a network infrastructure device, or other computing device as illustrated in FIGS. 1-6.

With reference to FIG. 1, an example network topology 100 presents a graph of nodes (represented by circles) and communication connections between those nodes (represented as line segments between circles). For example, node 105 represents an endpoint node that has a single communication connection to node 106. Also, node 108 represents an intermediary node between node 107 and node 109 with two total communication connections (i.e., a respective communication connection from node 108 to each of node 107 and node 109).

FIG. 1 also illustrates node 120 and node 125 that are logically (and possibly physically) distant (with respect to topology 100) from node 105. Node 120 represents another endpoint node in that it only has a single communication connection while node 125 has multiple communication connections. Topology 100 further illustrates what may be considered a network segment 135 (six nodes encircled by the dotted oval). There are only two nodes in topology 100 that are indicated to have one or more communication paths to nodes within network segment 135. Specifically, node 130A provides communication paths to two different nodes within network segment 135 and node 130B provides a single communication path to yet a third node within network segment 135. Accordingly, in the example of topology 100, any mesh link from a node outside of network segment 135 to a node within network segment 135 flows between at least one of node 130A or node 130B.

Using node 105 as an example, if node 105 were to establish a mesh link to a node within network segment 135, the first hop in that mesh link would be to node 106. There are several options depicted in example topology 100 where a second hop (outbound from node 106) for this mesh link could be defined because node 106 is illustrated to have three communication connections. In any case, data outbound to the network segment 135 from node 106 would traverse different communication connections through topology 100 until it arrived at either node 130A or node 130B prior to having any communication connection to a node within network segment 135.

In a typical mesh network, an individual mesh node may only be concerned with a next hop for any specific network transmission and may be instructed by a mesh controller (not shown) as to how to form a mesh link. For example: a mesh controller may instruct nodes to form a mesh link along a shortest path (e.g., least number of hops); the mesh controller may instruct nodes to form a mesh link along a least cost path (e.g., using nodes that have available bandwidth); or the mesh controller may instruct nodes to form a mesh link using a combination of these and other criteria. In any case, for the purposes this discussion of example topology 100, it is recognized that mesh links are formed between a source node (e.g., node 105) and a destination node (e.g., node 108).

Communication between the source node and the destination node of any mesh link (except a point-to-point link) flow through one or more intermediary nodes. The intermediary nodes may simply forward the communication (e.g., network packets) along a next hop of the mesh link (possibly at the direction of a mesh controller). Ultimately, after one or more hops the communication arrives at the destination node. To be clear, one example mesh link between node 105 and node 109 may be configured as utilizing node 106, node 107, and node 108 as intermediary nodes. However, there are other possible mesh links between node 105 and node 109 illustrated in topology 100 so the defined path through node 106, node 107, and node 108 represents only one of many possibilities.

Continuing to FIG. 2A, a functional block diagram 200A represents an example of a CNICD 205 (e.g., a device executing a network configuration application with a network configuration interface) and example communication flows to devices in a first data center 220 and to devices in a second data center 230, according to one or more disclosed examples. In diagram 200A there are several possible communication flows (e.g., mesh links) available for CNICD 205 to devices of a first data center 220. Other possible communication flows may exist to second data center 230 via an intermediary device (e.g., switch 250 using communication link 249 and communication link 251). It is possible that first data center 220 and second data center 230 are not within geographical proximity to each other and switch 250 may provide a wired network connection (e.g., a spanning network link) for at least a portion of a communication flow between CNICD 205 and devices in second data center 230. Alternatively, switch 250 may be wirelessly within range of both data centers 220, 230 and not use a wired network connection. In any case, switch 250 may act, in this example, to facilitate communication that "spans" between the two data centers 220, 230.

For clarity, not all instances of all elements are numbered in diagram 200A, however, like elements have identical visual representations. In the example represented by diagram 200A there are seven network infrastructure devices 221 illustrated in first data center 220 and seven network infrastructure devices 231 illustrated in second data center 230. First data center 220 further includes a switch 217 that connects to each of network infrastructure devices 221 (as explained further below). Second data center 230 similarly includes a switch 235 that connects to each of network infrastructure devices 231. In general, each of switch 217, switch 235, and switch 250 may be considered a network infrastructure device but for the purposes of this example only are not referenced as such to distinguish them from network infrastructure devices 221 and 231 that are the target of configuration information for this example. Further, the functionality provided by each of the devices identified as switches in this example may be performed by a device other than a switch (e.g., a bridge or a router).

Each bi-directional arrow in diagram 200A represents a communication link between devices pointed to by either end of that arrow. Specifically, within first data center 220, communication links 212 represent established communication links that may be wireless mesh network connections. A dashed bidirectional arrow (i.e., communication link 207A and communication link 213A) represents a possible but not necessarily active communication link. Wired communication links 210 are also illustrated between switch 217 and network infrastructure devices 221 in first data center 220. Also, within second data center 230, communication links 232 represent established communication links that may be wireless mesh network connections.

Having the above understanding, diagram 200A may be used to discuss interaction between CNICD 205 and a device to be configured which in this example is network infrastructure device 215 (a specific instance of the seven network infrastructure devices 221 in first data center 220). CNICD 205 may establish a wireless communication connection 206A (in this case point-to-point) with network infrastructure device 215. Wired communication link 216A is illustrated as a dotted line to indicate that the connection may be physically present but not yet enabled (see discussion above). Once enabled, communication link 216A may represent another instance of wired communication links 210. Communication link 207A is illustrated as a dashed bidirectional arrow to indicate that it represents a potential but not currently active alternative communication link for CNICD 205 (e.g., based on CNICD 205 moving its physical location throughout first data center 220).

Having established a wireless communication connection (i.e., communication link 206A) between CNICD 205 and network infrastructure device 215, a network configuration may be applied to network infrastructure device 215. That is, network infrastructure device 215 may be physically connected (via disabled wired communication link 216A) to the production network (not shown) of first data center 220 but not yet active on the production network. CNICD 205 may provide configuration information (e.g., in the form of device configuration parameters) to network infrastructure device 215. Once the configuration information from CNICD 205 has been successfully applied to network infrastructure device 215, that device may enable a port associated with wired communication link 216A and become an active participant in the production network of first data center 220. Communication link 213A between network infrastructure device 215 and switch 217 indicates that a wireless communication link may be established between those two devices as part of the configuration process. For example, communication link 213A may be established to allow transmission of further configuration information prior to enabling wired communication link 216A.

In the above example, CNICD 205 was discussed as establishing a point-to-point connection (in this case communication link 206A to the device to be configured (network infrastructure device 215)). However, CNICD 205 may have alternatively established its initial connection via communication link 207A and utilize a mesh link to network infrastructure device 215 to perform the same configuration interaction. That is, CNICD 205 may not have a direct connection to the device to be configured as long as a mesh link can be established (i.e., via other mesh nodes) between CNICD 205 and the device to be configured. Similarly, CNICD 205 does not have to be in the same data center as the device to be configured. Specifically, this example could be modified such that CNICD 205 establishes a mesh link (via switch 250) to an instance of a network infrastructure device 231 in second data center 230 and initiate configuration of that instance.

Continuing to FIG. 2B, functional block diagram 200B represents an alteration to that discussed above for diagram 200A. Specifically, communication paths for CNICD 205 have been altered. As mentioned above, this alteration may be based on physical movement of CNICD 205 within first data center 220 such that a different mesh point may be utilized to establish communication for CNICD 205. After relocation of CNICD 205, communication link 206B has been established between CNICD 205 and network infrastructure device 225. As mentioned above for network infrastructure device 215, network infrastructure device 225 represents an instance of the seven network infrastructure devices 221 for first data center 220.

Diagram 200B further illustrates wired communication link 216B as a solid line to indicate that, after application of configuration parameters, network infrastructure device 215 has enabled communication ports to participate in the production network of first data center 220. Also, communication link 213B has become a solid bi-directional arrow after application of configuration information to network infrastructure device 215.

To summarize, in the above examples, diagram 200A represents two data centers where a device may be configured and become part of a production network utilizing a wireless mesh network as described throughout this disclosure. Diagram 200B illustrates two data centers that may utilize a wired production network and, in parallel, maintain a wireless mesh network for on-going monitoring and maintenance activities.

This parallel wireless mesh network may be considered a wireless system administration mesh network that allows CNICD 205 to roam throughout each data center and provide a network administrative support interface for a network administrator. In this manner, a secure wireless administrative mesh network may be utilized for administrative purposes independently of any wired network. Historically, system administrative networks may have been implemented using a virtual local area network (VLAN) that segregates a logical portion of the bandwidth available on a wired network. Thus, having a secure wireless mesh administrative network represents an improvement to the art of system administration, in part, by introducing a parallel network that does not utilize the same communication medium (e.g., wire) as the network being supported. Specifically, if a VLAN is utilized as an administrative network, that VLAN is susceptible to any network failures caused by failure of the shared media (e.g., cable disconnected, wire cut, etc.). Independence may thus eliminate some potential failure scenarios as well as not share bandwidth availability for each network.

Referring now to FIG. 3, a functional flow chart 300 representing a possible workflow utilizing the disclosed CNICD (e.g., CNICD 205) is provided, according to one or more disclosed examples. As mentioned above, a wireless mesh configuration network may execute in parallel with a wired production network to allow various independent system administration activities for network devices (e.g., network infrastructure devices 221 of FIG. 2A). Specifically, network administrative activities may be performed for network devices that are not communicatively connected to a production wired network. These devices may not be connected to the production wired network, for example, because they do not have enabled wired communication ports or there may be some sort of failure of the wired network.

Flow chart 300 begins at block 305 where a new network device is received at a data center for installation. Block 310 indicates that the device may be installed (e.g., physically provisioned within the data center). Block 315 indicates that the "out of the box" and un-configured device may be connected to a wired production network with communication ports of the new network device disabled. Block 320 indicates that a wireless configuration network may be established between one or more un-configured devices and other devices. For example, peer devices may establish a wireless mesh communication network (independently from the wired production network) once the new network device broadcasts its availability to join the mesh network. Specifically, any other mesh nodes within communication range of the new network device may connect with that new network device and allow it to become another mesh node.

Block 325 indicates that a configuration interface device (e.g., CNICD 205) may establish a communication link to the new network device. This communication link may be directly from the configuration interface device to the un-configured new network device or may be via an intermediary mesh node. For example, as discussed above for FIGS. 2A-B, a CNICD 205 may establish a communication link via a wireless mesh network to the new network device. Block 330 indicates that the configuration interface device may cause application of a set of configuration parameters to configure the new network device.

Block 335 indicates that the new network device, having been configured with the application of the set of configuration parameters, may now have wired communication ports enabled to make it communicatively coupled to the wired production network. Block 340 indicates that the wireless administrative network may continue to execute in parallel with the production wired network. Block 345 indicates that this parallel network may be utilized to support system administration activities (e.g., network administration).

For example, one possible administrative workflow may utilize the mesh network in parallel with the production wired network to perform on-going maintenance, monitoring, and management of production devices. That is, administrative activities may be performed using the mesh network as a messaging mechanism to provide information to a network management application or to provide alerts. Specifically, it may not be possible for a device that has a failed interface to the wired network to send an alert through that failed interface. However, the mesh network interface may still be available for alert generation after the wired network interface for a device has failed. Historically, a device having a failed network interface would likely be "detected" as failed because of a noticed absence from the network (e.g., no messages for a time period). In contrast, when a secondary communication path is available (i.e., the mesh administrative network) a device may be able to internally detect a network interface failure and proactively message, via the secondary communication path, that the device is experiencing failure.

In practice, a system administration network may be used to gather information from one, many, or all nodes of a network (e.g. pull error logs from a node that failed and disconnected from the wired network) through a mesh network connection. Likewise, mesh nodes (e.g., peer-nodes, as well as the CNICD) may be configured to expect to receive a periodic message of "availability status" from other nodes. In the case of a downed device, the "availability status" may indicate the above referenced failure condition. These "availability status" messages may be sent via the mesh network and then used to forward information through the wired network or back through the mesh network (e.g., to a central repository). In this manner, the mesh network may act as an alternative messaging system (e.g., an augmented administrative network complementing or working independently of the traditional communication methods provided by a production wired network). The augmented administration network may be used to: a) dispense administrative information to the network and b) aggregate monitoring information back to a central repository. Other uses are also possible. In the augmented administrative network, a message may utilize either a mesh network hop or a wired network hop to transition from one node to the next. The message may also alternate between the two networks for each hop (e.g., based on availability of next hop) multiple times to reach an intended destination (e.g., central repository).

Returning to FIG. 3, block 350 indicates that other, possibly remote, data centers may be connected to the mesh administrative network. As mentioned above, in some cases two wireless mesh networks may be bridged together using a wired connection, for example, to span a long geographic distance. Block 355 indicates that the configuration interface device may move around within a data center and maintain connectivity to the mesh administrative network via different mesh points available within the data center (e.g., as illustrated in FIGS. 2A-B above).

Referring now to FIG. 4, an example flow is illustrated as method 400 representing possible functions performed by a CNICD to assist in configuration of a network infrastructure device (e.g., switch/router). As mentioned above, a network infrastructure device may be initially connected to a production wired network with each of its connected ports disabled via a software configuration of that device. Using a CNICD and configuration techniques of this disclosure, a secure configuration may be applied to the network infrastructure device. Once the secure configuration is applied the wired communication ports may be enabled (or become enabled automatically as part of application of the secure configuration) to allow communication of the network infrastructure device on the wired network.

Method 400 begins at block 405 where a short range wireless connection may be established between a CNICD and a first device communicably coupled to a wireless mesh network administration network. This connection represents a point-to-point connection between the CNICD and the first device. In some cases, the first device will be the network infrastructure device to be configured. In other cases, the first device will provide a first hop in a communication path to establish communication between the CNICD and the network infrastructure device to be configured. Thus, as illustrated at block 410 a communication path (e.g., mesh link) between the CNICD and the network infrastructure device to be configured is established.

Block 415 indicates that configuration information may be provided to the network infrastructure device. In some implementations a CNICD may provide the configuration information from information stored locally at the CNICD. Alternatively, the CNICD may act as a relay to interface the network infrastructure device to a repository that stores the configuration information. For example, the CNICD may provide a conduit for transmission of configuration information to the network infrastructure device that is not yet able to access a wired network (e.g., ports are still disabled).

In yet another implementation, a basic security configuration may be applied from the CNICD to the network infrastructure device and then allow the wired ports to be enabled such that the network infrastructure device may obtain further configuration information via a secure wired connection. Other variations are also possible. Simply put, the CNICD initiates a secure method of applying desired configuration information to the network infrastructure device such that wired communication from the network infrastructure device is not permitted prior to at least an initial configuration.

In some implementations, the network infrastructure device may not be physically connected to a wired network prior to a complete set of configuration information being applied with the assistance of the CNICD. Actual implementation details may depend on the security protocols of an organization for which the network infrastructure device is being implemented. For example, a Bluetooth® transport, implemented as part of the disclosed mesh network, may further allow authentication mechanisms that interface with already present security solutions (e.g., user/login management with an authentication system). In some cases, automation of various security tasks may be performed remotely. In general, network security solutions that are able to interface with a federated Bluetooth® network may be part of an overall implementation of disclosed techniques that simplify the process of managing network devices.

Block 420 indicates that the wired communication ports of the network infrastructure device may be enabled at the appropriate point in the configuration process as outlined above. Block 425 indicates that a CNICD and parallel wireless mesh network may be used in an on-going manner to manage a production network in parallel with its production functions utilizing the wired network. Alternatively, once the network infrastructure device is provisioned as part of the production network, the wireless mesh network access for that network infrastructure device may be terminated.

FIG. 5 is an example computing device 500, with a hardware processor 501, and accessible machine-readable instructions stored on a machine-readable medium 502 for implementing one example CNICD incorporating functionality to provide network infrastructure device configuration via a wireless mesh administrative network, according to one or more disclosed example implementations. FIG. 5 illustrates computing device 500 configured to perform the flow of method 400 as an example. However, computing device 500 may also be configured to perform the flow of other methods, techniques, functions, or processes described in this disclosure. In this example of FIG. 5, machine-readable storage medium 502 includes instructions to cause hardware processor 501 to perform blocks 405-425 discussed above with reference to FIG. 4.

A machine-readable storage medium, such as 502 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Referring now to FIG. 6, a computer network infrastructure 600 is illustrated. Computer network infrastructure 600 may be used to implement all or part of the disclosed techniques to utilize a parallel wireless administrative mesh network for initial or on-going configuration of network infrastructure devices, according to one or more disclosed examples. Network infrastructure 600 includes a set of networks where implementations of the present disclosure may operate and be utilized. Network infrastructure 600 includes a customer network 602, network 608 (e.g., the Internet), cellular network 603, and a cloud service provider network 610. In one example implementation, the customer network 602 may be a local private network, such as local area network (LAN) that includes a variety of network devices that include, but are not limited to switches, servers, and routers. Within customer network 602 there are illustrated a plurality of wireless access points 650 that may each facilitate wireless network connectivity within customer network 602. In this example, wireless access points 650 are illustrated as utilizing Bluetooth® wireless technology although other technologies are also possible without departing from the scope of this disclosure. There may be one or more WLANs supported with in customer network 602 and each of these WLANs may be logically divided into one or more VLANs. Different WLANs within customer network 602 may utilize different wireless technologies to support wireless clients as described above. Some or all of the WLANs within customer network 602 may be implemented with the capabilities to instantiate a mesh network as disclosed herein.

Each of these networks may contain wired or wireless programmable devices and operate using any number of network protocols (e.g., Transmission Control Protocol/Internet Protocol, or "TCP/IP") and connection technologies (e.g., WiFi® networks, or Bluetooth®). In another example, customer network 602 represents an enterprise network that could include or be communicatively coupled to one or more local area networks (LANs), virtual networks, data centers (see FIGS. 2A-B) and/or other remote networks (e.g., 608, 610). In the context of the present disclosure, customer network 602 may include a network device supporting an administrative management system such as that described above. Additionally, customer network 602 may represent a target network supported by disclosed implementations of wireless network administration.

As shown in FIG. 6, customer network 602 may be connected to one or more client devices 604A-E and allow the client devices 604A-E to communicate with each other and/or with cloud service provider network 610, via network 608 (e.g., Internet). Client devices 604A-E may be computing systems such as desktop computer 604B, tablet computer 604C, mobile phone 604D, laptop computer (shown as wireless) 604E, and/or other types of computing systems generically shown as client device 604A.

Network infrastructure 600 may also include other types of devices generally referred to as Internet of Things (IoT) (e.g., edge IoT device 605) that may be configured to send and receive information via a network to access cloud computing services or interact with a remote web browser application (e.g., to receive configuration information).

FIG. 6 also illustrates that customer network 602 includes local compute resources 606A-C that may include a server, access point, router, or other device configured to provide for local computational resources and/or facilitate communication amongst networks and devices. For example, local compute resources 606A-C may be one or more physical local hardware devices. Local compute resources 606A-C may also facilitate communication between other external applications, data sources (e.g., 606A and 606B), and services, and customer network 602.

Network infrastructure 600 also includes cellular network 603 for use with mobile communication devices. Mobile cellular networks support mobile phones and many other types of mobile devices such as laptops etc. Mobile devices in network infrastructure 600 are illustrated as mobile phone 604D, laptop computer 604E, and tablet computer 604C. A mobile device such as mobile phone 604D may interact with one or more mobile provider networks as the mobile device moves, typically interacting with a plurality of mobile network towers 620, 630, and 640 for connecting to the cellular network 603.

FIG. 6 illustrates that customer network 602 is coupled to a network 608. Network 608 may include one or more computing networks available today, such as other LANs, wide area networks (WAN), the Internet, and/or other remote networks, in order to transfer data between client devices 604A-D and cloud service provider network 610. Each of the computing networks within network 608 may contain wired and/or wireless programmable devices that operate in the electrical and/or optical domain.

In FIG. 6, cloud service provider network 610 is illustrated as a remote network (e.g., a cloud network) that is able to communicate with client devices 604A-E via customer network 602 and network 608. The cloud service provider network 610 may act as a platform that provides additional computing resources to the client devices 604A-E and/or customer network 602. In one example implementation, cloud service provider network 610 includes one or more data centers 612 with one or more server instances 614. Cloud service provider network 610 may also include one or more frames representing a scalable compute resource that may benefit from the techniques of this disclosure. Each of the disclosed network administrative capabilities may be implemented for one or more data centers (not specifically illustrated) that may benefit from disclosed techniques for additional security.

FIG. 7 illustrates a computing device 700 that may be used to implement the functions, modules, processing platforms, execution platforms, communication devices, and other methods and processes of this disclosure. For example, although not specifically mentioned above, different functionality for network configuration based on wireless mesh network techniques may be implemented by different functional modules that may execute directly on physical hardware or be implemented with at least one level of abstraction from the physical processors and utilize virtualization. For example, computing device 700 illustrated in FIG. 7 could represent a client device or a physical server device and include either hardware or virtual processor(s) depending on the level of abstraction of the computing device. In some instances (without abstraction), computing device 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware.

As also shown in FIG. 7, computing device 700 may include one or more input devices 730, such as a keyboard, mouse, touchpad, or sensor readout (e.g., biometric scanner) and one or more output devices 715, such as displays, speakers for audio, or printers. Some devices may be configured as input/output devices also (e.g., a network interface or touchscreen display).

Disclosed techniques to provide improved network access may further benefit software solutions that perform system administration functions. Network infrastructure device management software may be impacted by connectivity limitations imposed by the existing system management paradigm of serial-console-servers (SCS) on a management network. For example, there are a limited number of switches that can connect to the SCS at a given time. Further each switch may share the SCS hardware such that it limits the maximum number of connections. For example, a 64-port SCS may connect to 64 switch management interfaces, but only allow 16 simultaneous systems, and impose a limit on connections per system to be managed. Thus, in a network with many more than 64 switches, a system administrator may utilize multiple different SCSs to manage the network. This type of limitation may make it difficult to manage a large data center of switches from one interface because the connections between switches may limit the reach of one software instance (e.g., number of systems that may be interfaced simultaneously from a software solution). Still further, systems that connect to separate management networks cannot be natively managed by software without a network bridge between the separate networks. In contrast, allowing each switch to participate as a mesh node within a mesh network may allow dynamic network configuration, bridging, and mesh connectivity for all switches simultaneously (i.e., the SCS limitation is removed). Accordingly, a single software instance may then be able to communicate with any network switches connected to the mesh network simultaneously.

Additionally, software that interfaces through an SCS may utilize a command line interface (CLI) for switch management. These implementations may be passive (only responding to commands) and text based because of the serial interface. However, disclosed implementations may allow enhanced connectivity and thus allow for richer software interfaces over CLI. In some cases, the CLI may be replaced by a graphical interface running a bidirectional connection with each switch endpoint. This interface may additionally be able to store and retrieve state, run configuration macros, manage switches individually or in groups, notify users of events and error, and deploy software across the network with minimal user intervention. Using an enhanced interface, switches may be managed from a phone, PC, tablet, or other device that has network connectivity. For example, a system administrator with WAN access can push information to the customer applications when issues occur, as opposed to the historically available CLI script processing that may rely on code to trigger an event.

The mesh network interface system as proposed herein, may also include functionality to be provided a set of rules with which to automatically manage the network (e.g. through input by a network management workflow application). One example of rule sets may allow for state management of the network, such that if the network is changed in such a way that would force an illegal state or make a node/subset of the overall network vulnerable to security attacks, the rules imposed upon the mesh network would automatically reconfigure the corresponding network(s) (user, management, or otherwise) appropriately. A second example of rule sets may allow for setting security permissions for one or more specific users' ability to communicate with devices or apply changes to the network. These permissions may be implemented in a similar manner as used for database management (e.g. users being able to insert or delete rows in certain tables). A third example of rule sets may allow for automating node/system failure diagnostics for gathering and reporting error information through the mesh network. Rule sets may also be dynamically adjusted, subtracted, or altered as needed. These rule sets may allow for an automated, internal, self-sustaining network management system implemented using incorporated/embedded rule sets across the mesh network.

Returning to FIG. 7, computing device 700 may also include communications interfaces 725, such as a network communication unit that could include a wired communication component and/or a wireless communications component, which may be communicatively coupled to processor 705. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi®, cellular, and/or other communication methods.

As illustrated in FIG. 7, computing device 700 includes a processing element such as processor 705 that contains one or more hardware processors, where each hardware processor may have a single or multiple processor core. In one implementation, the processor 705 may include at least one shared cache that stores data (e.g., computing instructions) that are utilized by one or more other components of processor 705. For example, the shared cache may be a locally cached data stored in a memory for faster access by components of the processing elements that make up processor 705. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 7, the processing elements that make up processor 705 may also include one or more of other types of hardware processing components, such as graphics processing units (GPU), application specific integrated circuits (ASICs), field-programmable gate arrays (FPGAs), and/or digital signal processors (DSPs).

FIG. 7 illustrates that memory 710 may be operatively and communicatively coupled to processor 705. Memory 710 may be a non-transitory medium configured to store various types of data. For example, memory 710 may include one or more storage devices 720 that comprise a non-volatile storage device and/or volatile memory. Volatile memory, such as random-access memory (RAM), can be any suitable non-permanent storage device. The non-volatile storage devices 720 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 720 may be used to store overflow data if allocated RAM is not large enough to hold all working data. The non-volatile storage devices 720 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 705. In one implementation, the compiling process of the software program may transform program code written in a programming language to another computer language such that the processor 705 is able to execute the programming code. For example, the compiling process of the software program may generate an executable program that provides encoded instructions (e.g., machine code instructions) for processor 705 to accomplish specific, non-generic, particular computing functions.

After the compiling process, the encoded instructions may then be loaded as computer executable instructions or process steps to processor 705 from storage device 720, from memory 710, and/or embedded within processor 705 (e.g., via a cache or on-board ROM). Processor 705 may be configured to execute the stored instructions or process steps in order to perform instructions or process steps to transform the computing device into a non-generic, particular, specially programmed machine or apparatus. Stored data, e.g., data stored by a storage device 720, may be accessed by processor 705 during the execution of computer executable instructions or process steps to instruct one or more components within the computing device 700.

A user interface (e.g., output devices 715 and input devices 730) can include a display, positional input device (such as a mouse, touchpad, touchscreen, or the like), keyboard, or other forms of user input and output devices. The user interface components may be communicatively coupled to processor 705. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 700 may comprise other components well known in the art, such as sensors, powers sources, and/or analog-to-digital converters, not explicitly shown in FIG. 7.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. Specifically, the order of acts for any disclosed method may be altered based to accommodate different design criteria in some implementations. It is intended that the following claims be interpreted to embrace all such variations and modifications.

What is claimed is:

1. A network infrastructure device comprising:
a radio coupled to a wireless communication interface to communicate with a plurality of wireless remote devices on a wireless mesh network;
a wired network interface for communicatively coupling to a wired network;
a processing device communicatively coupled to the radio, the wireless communication interface, and the wired network interface; and
a memory storing instructions, that when executed by the processing device, cause the network infrastructure device to:
establish a wireless connection with a client network infrastructure configuration device (CNICD) via the wireless mesh network;
receive a set of configuration parameters for a target network device, via the wireless connection, from the CNICD; and
act as a mesh point for the wireless mesh network to allow communication via a mesh link, between the CNICD and the target network device, prior to allowing the target network device to accept a communication enabled connection to the wired network, wherein the network infrastructure device acts as an intermediary on the mesh network to allow administrative communication between the CNICD and the target network device, the administrative communication including the set of configuration parameters for the target network device, the set of configuration parameters allowing the target network device to enable a port for active connection to the wired network.

2. The network infrastructure device of claim 1, wherein the radio is connected via a serial port of the network infrastructure device.

3. The network infrastructure device of claim 1, wherein the radio is connected via a universal serial bus (USB) interface of the network infrastructure device.

4. The network infrastructure device of claim 1, wherein the instructions to cause the network infrastructure device to establish a wireless connection include instructions to take over a previously established wireless connection between the CNICD and a different mesh node.

5. The network infrastructure device of claim 4, wherein the target device is identified prior to taking over the previously established wireless connection.

6. The network infrastructure device of claim 4, wherein the network infrastructure device and the different mesh node coordinate communication to the CNICD based on proximity of the CNICD to the network infrastructure device and the different mesh node.

7. The network infrastructure device of claim 1, wherein the network infrastructure device is located in a first data center, the target network device is located in a second data center, and the mesh link includes a spanning network link between the first data center and the second data center.

8. The network infrastructure device of claim 7, wherein the spanning network link between the first data center and the second data center uses a wired network connection.

9. The network infrastructure device of claim 8, wherein the mesh link includes only wireless hops except for the spanning network link.

10. The network infrastructure device of claim 1, wherein communication via the wired network is blocked for the target network device by at least one disabled network port of the target network device until successful application of the set of configuration parameters.

11. A computer-implemented method for configuring network infrastructure devices, the method comprising:
establishing a wireless connection between a client network infrastructure configuration device (CNICD) and a first network infrastructure device using a wireless mesh network;
receiving a set of configuration parameters for a target network device, via the wireless connection, from the CNICD;
using the first network infrastructure device as a mesh point to provide a mesh link between the CNICD and the target network device, prior to allowing the target network device to accept a communication enabled connection to a wired network, wherein the first network infrastructure device acts as an intermediary on the mesh network to allow administrative communication between the CNICD and the target network device, the administrative communication including the set of configuration parameters for the target network device, the set of configuration parameters allowing the target network device to enable a port for active connection to the wired network.

12. The computer-implemented method of claim 11, wherein the first network infrastructure device is located in a first data center, the target network device is located in a second data center, and the mesh link includes a spanning network link between the first data center and the second data center.

13. The computer-implemented method of claim 12, wherein the spanning network link between the first data center and the second data center uses a wired network connection.

14. The computer-implemented method of claim 13, wherein the mesh link includes only wireless hops except for the spanning network link.

15. The computer-implemented method of claim 1, wherein communication via the wired network is blocked for the target network device by at least one disabled network port of the target network device until successful application of the set of configuration parameters.

16. A non-transitory computer readable medium comprising computer executable instructions that, when executed by one or more processing units, cause the one or more processing units to:
establish a wireless connection with a client network infrastructure configuration device (CNICD) via a wireless mesh network;
receive a set of configuration parameters for a target network device, via the wireless connection, from the CNICD;
act as a mesh point for the wireless mesh network to allow communication via a mesh link, between the CNICD and the target network device, prior to allowing the target network device to accept a communication enabled connection to the wired network, wherein the network infrastructure device acts as an intermediary on the mesh network to allow administrative communication between the CNICD and the target network device, the administrative communication including the set of configuration parameters for the target network device, the set of configuration parameters allowing the target network device to enable a port for active connection to the wired network.

17. The non-transitory computer readable medium of claim 16, wherein the instructions cause the one or more processing units to establish the wireless connection using a radio connected via a serial port.

18. The non-transitory computer readable medium of claim 16, wherein the instructions cause the one or more processing units to establish the wireless connection using a radio connected via a universal serial bus (USB).

19. The non-transitory computer readable medium of claim 16, wherein the instructions to cause the one or more processing units to establish a wireless connection include instructions to take over a previously established wireless connection between the CNICD and a different mesh node.

20. The non-transitory computer readable medium of claim 19, wherein the instructions further cause the one or more processing units to coordinate communication to the CNICD based on proximity of the CNICD to the different mesh node.

\* \* \* \* \*